United States Patent [19]

Kato et al.

[11] 4,340,911
[45] Jul. 20, 1982

[54] IMAGE GRADATION PROCESSING METHOD AND APPARATUS FOR MAMMOGRAM COPYING SYSTEM

[75] Inventors: Hisatoyo Kato; Masamitsu Ishida; Seiji Matsumoto, all of Minami-ashigara, Japan

[73] Assignee: Fuji Photo Film Co., Ltd., Kanagawa, Japan

[21] Appl. No.: 123,697

[22] Filed: Feb. 22, 1980

[30] Foreign Application Priority Data

Feb. 28, 1979 [JP] Japan .................................. 54-23090

[51] Int. Cl.³ .............................................. H04N 5/32
[52] U.S. Cl. ..................................... 358/280; 358/284; 358/111; 364/414; 250/416 TV; 250/363 S
[58] Field of Search ............... 358/111, 282, 280, 284, 358/96, 166; 364/414, 515; 250/272, 320, 416 TV, 363

[56] References Cited

U.S. PATENT DOCUMENTS

| 3,006,238 | 10/1961 | Eberline | 358/96 |
| 3,696,249 | 10/1972 | Bowker | 358/96 |
| 3,936,598 | 2/1976 | Newitt | 358/96 |
| 4,020,347 | 4/1977 | Geluk | 358/111 |
| 4,306,290 | 12/1981 | Kato et al. | 358/166 |

Primary Examiner—John C. Martin
Assistant Examiner—Edward L. Coles
Attorney, Agent, or Firm—Gerald J. Ferguson, Jr.; Joseph J. Baker

[57] ABSTRACT

A method of and apparatus for processing a mammogram in a mammogram copying system in which an original mammogram is scanned with a scanning light beam and the light transmitted through the mammogram is detected by a photodetector which gives an output to be processed and used for recording a visible image on a recording medium. The image gradation of the mammogram is processed. The gradation processing is characterized in that the minimum density of the glandular tissue of the mammogram is lowered down to the level of the fog density to raise the contrast of the mammogram.

8 Claims, 11 Drawing Figures

IMAGE GRADATION PROCESSING METHOD AND APPARATUS FOR MAMMOGRAM COPYING SYSTEM

BACKGROUND OF THE INVENTION

1. Field of the Invention

This invention relates to a method of processing the gradation of a mammogram and apparatus therefor, and more particularly to a method of and apparatus for processing the image gradation of a mammogram in a mammogram copying system in which an original mammogram is read out and recorded on a recording medium.

2. Description of the Prior Art

In the mammography, an X-ray film is generally used for recording the X-ray transmission image of the mamma. The mammogram is observed with the naked eyes or a magnifying glass for diagnosis. In the mammogram, there are recorded the glandular tissue, the subcutaneous tissue and the skin. The glandular tissue has the lowest density since the transmittance thereof to the X-rays is the lowest. The subcutaneous tissue has the second lowest density since the transmittance thereof to the X-rays is comparatively low. Blood vessels run in these tissues but have a low contrast since their X-ray absorption difference is very small. The skin has a high density since the transmittance thereof to the X-rays is high. The part outside the substantial image of the mamma has the upmost density since this part of the X-ray film is exposed to X-rays directly coming from the X-ray source.

As mentioned above, the mammogram has a wide range of density ranging from 0 to 3.5 in terms of optical density. Further, since the various parts are not recorded in the desirable contrast respectively, it is very difficult and necessary to have a great skill to make proper diagnosis from the mammogram in which the disease must be found out from a very slight variation in density in the image.

Then, the inventors of this invention have invented a radiographic image processing system in which a normal radiograph is used as an original image and is optically scanned and read, and the read out signal is processed by a signal processing means to change the various image properties such as contrast and the density level, and then the processed signal is used for reproducing an improved image on a copying film.

In the radiography, however, the recorded image is used for the purpose of "diagnosis" and the diagnostic efficiency and accuracy (the level of easiness for diagnosis of adaptability to diagnosis) are not simply enhanced by simply making so-called "good" image from the point of the ordinary image quality factors such as sharpness granularity and contrast. Rather than these factors, the diagnosis efficiency and accuracy are influenced by other complex factors such as reference with the normal pattern, reference with the anatomical structure and utilization of other diagnostic view or records.

SUMMARY OF THE INVENTION

The primary object of the present invention is to provide a method of and apparatus for processing the image gradation of a mammogram to effectively improve the diagnostic efficiency and accuracy thereof.

Another object of the present invention is to provide a method of and apparatus for processing the image gradation of a mammogram in a mammogram copying system which is capable of obtaining an improved mammogram having high diagnostic efficiency and accuracy from a normal mammogram obtained by the conventional radiography or mammography.

The method of and apparatus for processing the image gradation of a mammogram of this invention is characterized in that the minimum density of the glandular tissue is lowered to the level of the fog density of the recording material like a photographic film and the density of the reproduced image is lowered as a whole with the lowered degree decreasing from the lower density to the higher (including the case where the lowered degree decreasing down to a negative value). By this image gradation processing, the contrast of the image is raised as a whole and the diagnostic efficiency and accuracy are enhanced.

Further, the present invention is, in a preferred embodiment thereof, characterized in that the density at the boundary of the subcutaneous tissue and the skin is raised to lower the contrast of the skin and raise the contrast of the glandular tissue and the subcutaneous tissue. By this further processing, the density of the glandular tissue is lowered and the contrast thereof is enhanced, which results in enhancement of the diagnostic efficiency and accuracy. Though the contrast of the subcutaneous tissue and the skin is lowered in this case, this does not affect the diagnostic efficiency and accuracy since the contract of these portions is originally high and the contrast of whole the image is enhanced by lowering the density of the glandular tissue.

In general, most of the mammograms are made for the purpose of observing the glandular tissue and the subcutaneous tissue. Therefore, in accordance with the present invention in which the contrast of the glandular tissue and the subcutaneous tissue is particularly improved, the diagnostic efficiency and accuracy of these tissues are markedly enhanced without lowering the diagnostic efficiency and accuracy of the skin.

DESCRIPTION OF THE PREFERRED EMBODIMENTS

Now the present invention will be described in detail with reference to the drawings.

Figure 1:
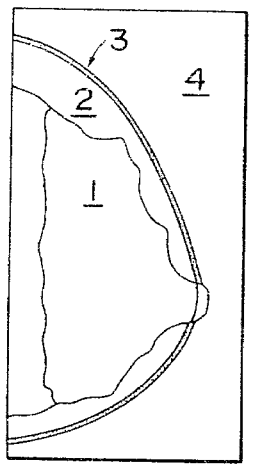
FIG. 1 is an example of a mammogram to be processed in accordance with the present invention.

Referring to FIG. 1, a mammogram has images of the glandular tissue 1, the subcutaneous tissue 2, the skin 3 and the background 4. Since the conventional mammogram does not have a desirable density and contrast, the accurate diagnosis is not easy from the mammogram as it is. In accordance with the present invention, therefore, the mammogram is read out by an optical scanning means to obtain the X-ray image information of the mammogram and the read out information is reproduced on a copying film like a photographic film after the read out information is processed to change the density and contract of the image as mentioned above.

Figure 2A:
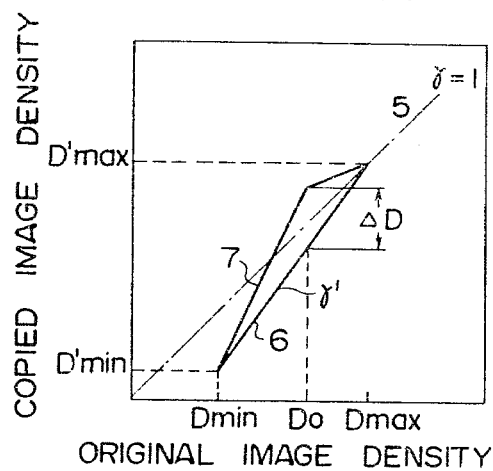
FIGS. 2A and 2B are graphs showing the basic embodiments of the gradation processing in accordance with the present invention.
Figure 2B:
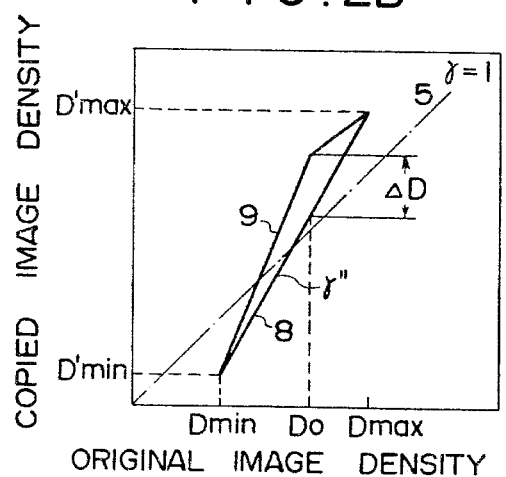

FIGS. 2A and 2B are graphs showing embodiments of the image gradation processing in accordance with the present invention. In the original mammogram, the glandular tissue 1 has the lowest density and the subcutaneous tissue 2, the skin 3 and the background 4 have the higher densities in this order. Since the background has nothing to do with the diagnosis by the mammogram, the density of the skin 3 is adopted as the maximum density Dmax. Therefore, by obtaining the minimum value Dmin of the density of the glandular tissue 1 and the maximum value Dmax of the density of the skin 3 and performing the density conversion only on the densities between these values, it is possible to conduct the image gradation processing on the necessary image to obtain a copied image having high diagnostic efficiency and accuracy.

In FIGS. 2A and 2B, the chain line 5 represents the linear density conversion without any gradation processing. The gradient ($\gamma$) of the linear density conversion is determined as a unit, i.e. $\gamma = 1$. The solid lines 6 and 7 both show the density conversion curves used in the present invention. The curve 6 shown in FIG. 2A is obtained by lowering the minimum density value Dmin of the glandular tissue 1 down to the fog density D'min of the copying film to enlarge the gamma ($\gamma$) of the density conversion. In this case, the value D'min may be raised by about 0.3 in optical density from the level of the fog density. If the D'min is raised by more than 0.3 from the fog density, the minimum density areas of the image which should be almost transparent or white becomes too foggy and the image quality of the final copied image is undesirably lowered. Therefore, the value D'min should not be raised over 0.3 from the level of the fog density of the copying film. By conducting the above described density conversion, the contrast of the glandular tissue 1, the subcutaneous tissue 2 and the skin 3 is raised and the density of the image is lowered as a whole. It should be noted that the lowered minimum density should be lower than the original minimum density Dmin even when the minimum density is selected to be higher than the fog density by a level within the range of 0.3.

The solid line 7 in FIG. 2A represents a density conversion in which the density level is raised as a whole from the level of the curve 6 with the density at the boundary between the subcutaneous tissue 2 and the skin 3 being most raised. The boundary density is designated by Do and the raised level or degree of density is designated by $\Delta D$. By this density conversion, the contrast of the glandular tissue 1 and the subcutaneous tissue 2 having the density within the range of Dmin to Do is raised, and the contrast of the skin 3 having the density within the range of Do to Dmax is lowered.

Further, in case that the maximum density value Dmax of the skin 3 is not so high, it is desirable to raise the maximum density value so that the maximum density in the copied image may become higher than the maximum density in the original image to enhance the diagnostic efficiency and accuracy. The level of the maximum density value D'max should preferably be selected to be 2.0 or higher though it depends upon the liking of the person who conducts the diagnosis based thereon. FIG. 2B shows some examples of the gradation processing based on this modification. Both the curves 8 and 9 have the maximum density level higher than the original maximum level.

The degree of the raising of the density level $\Delta D$ is selected according to the respective mammogram and the liking of the doctor who conducts the diagnosis. As a result of the tests, it was proved that the diagnostic efficiency and accuracy were enhanced when the raised level of density $\Delta D$ was 0 to 0.7. And it was found that the diagnostic efficiency and accuracy were further enhanced when the $\Delta D$ was 0.1 to 0.7. The desirable range of the raised level $\Delta D$ was not changed even when the D'max and D'min were changed within said ranges.

Figure 3:
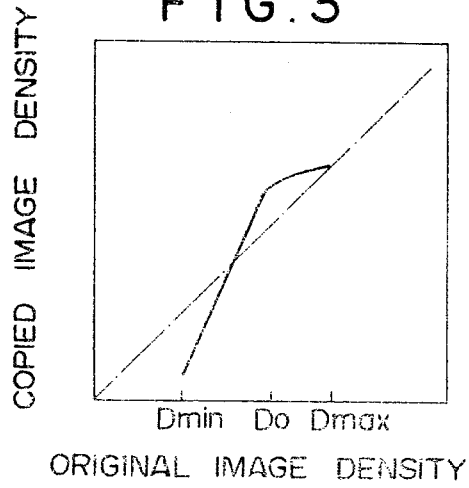
FIGS. 3 and 4 are graphs showing other embodiments of the gradation processing in accordance with the present invention.
Figure 4:
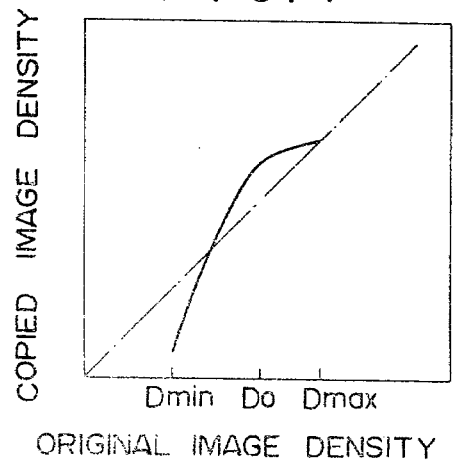

In the embodiment shown in FIG. 2, since the gradation variation is made discontinuous at the boundary level Do. The variation in density is also made discontinuous at the boundary and the image appears unnatural because of the discontinuity. Accordingly, it is desirable that the variation of the density be made continuous or smooth at the boundary level Do as shown in FIGS. 3 and 4. In FIG. 3, the angled point at the boundary level Do is rounded. In FIG. 4, the whole curve is changed continuously. With these embodiments as shown in FIGS. 3 and 4, the gradation variation is made smooth and natural.

The results were evaluated by four radiologists since it was impossible to evaluate the diagnostic efficiency and accuracy by the objective physical evaluation by use of sharpness, contrast and granularity.

The standard evaluation was as follows.

+2: The diagnostic efficiency and accuracy were greatly enhanced and improved. For instance, the diseased portions which were hardly recognized in the original radiograph have become clearly recognizable.

+1: The diagnostic efficiency and accuracy were improved. For instance, the diseased portions which were difficult to recognize have become recognizable.

0: The diagnostic efficiency and accuracy were not so improved, though the image has become somewhat clearer.

−1: The diagnostic efficiency and accuracy were lowered in some parts even though they were somewhat improved in other parts.

−2: The diagnostic efficiency and accuracy were lowered with no parts where they were improved.

Figure 5A:
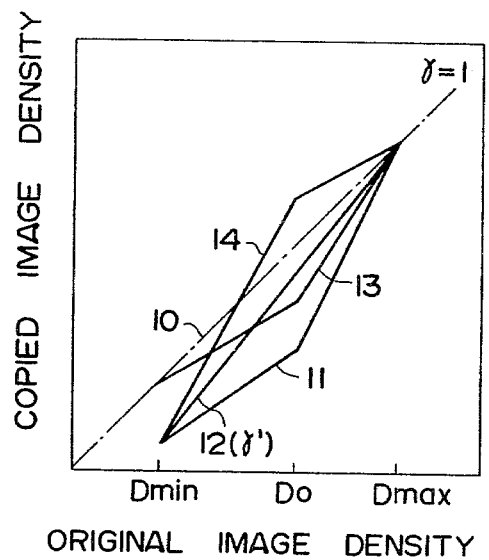
FIGS. 5A, 5B and 6 are graphs showing various embodiments of the gradation processing in accordance with the present invention and some examples of the gradation processing which are not included in the present invention.
Figure 5B:
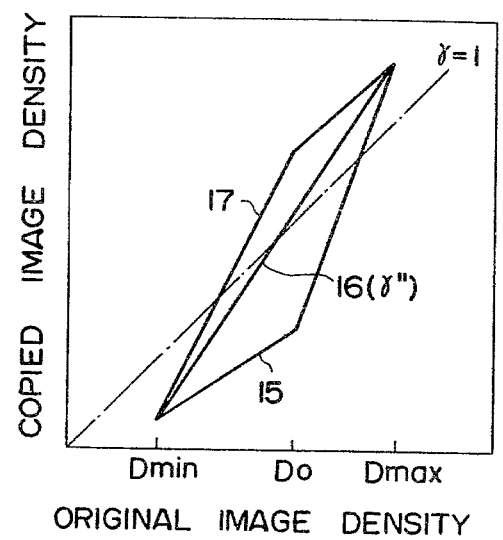

Under the above standard, original images of ten samples of mammogram including the normal pattern, cancer pattern, calcification pattern and so forth which were subjected to the gradation processing of various types as shown in FIGS. 5A and 5B were presented to four radiologists and the diagnostic efficiency and accuracy were evaluated for these samples. In FIGS. 5A and 5B, the curves 12, 14, 16 and 17 are examples of the gradation processing in accordance with this invention. (In curves 14 and 17, the density at the boundary density Do is raised by 0.3), the curve 10 represents the linear density conversion without any gradation processing, and curves 11, 13 and 15 show examples of the gradation processing not based on the present invention.

The results of the evaluation are shown in Table 1.

TABLE 1

| Gradation Processing | Evaluation (average value) | General Evaluation |
| --- | --- | --- |
| Curve 10 | ±0 | No change |
| Curve 11 | −1.2 | Degraded |
| Curve 12 | +0.8 | Improved |
| Curve 13 | −2.0 | Degraded |
| Curve 14 | +1.6 | Much improved |
| Curve 15 | −0.6 | Slightly degraded |
| Curve 16 | +1.4 | Improved |
| Curve 17 | +1.8 | Much improved |

Then, in order to find out the effective range of the degree of density lowering ΔD at the boundary level Do, ten samples were evaluated by four radiologists.

Figure 6:
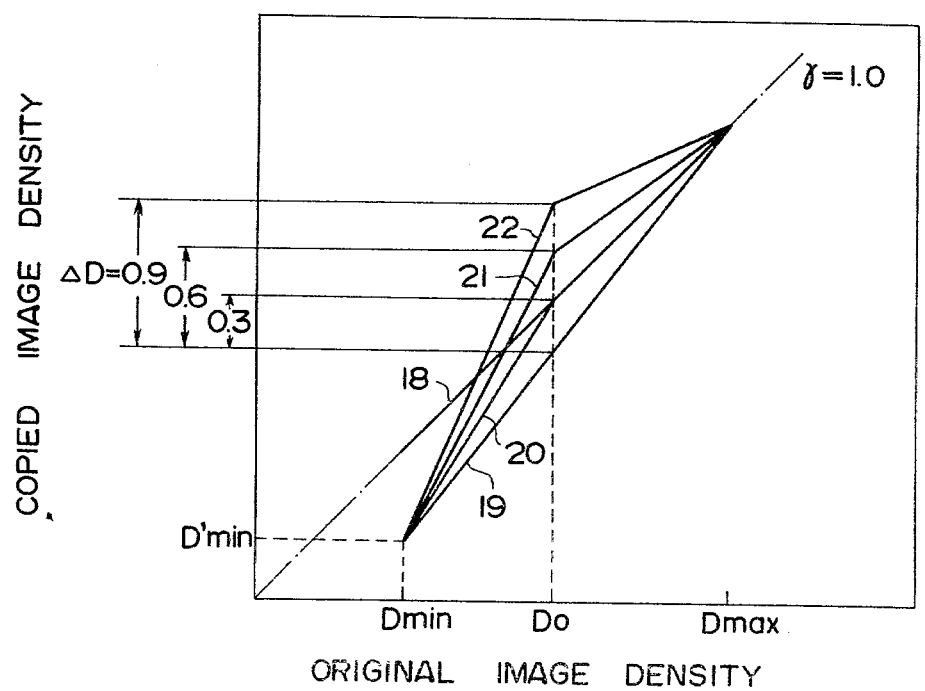

The gradation processes conducted are shown in FIG. 6. The degree of density lowering ΔD was made 0, 0.3, 0.6 and 0.9 in the examples shown by curves 19, 20, 21 and 22. The curve 18 shows an example without any gradation processing.

The results of the evaluation are shown in Table 2.

TABLE 2

| Gradation Processing | Evaluation (average value) | General Evaluation |
| --- | --- | --- |
| Curve 18 | ±0 | No change |
| Curve 19 | +0.8 | Improved |
| Curve 20 | +1.6 | Much improved |
| Curve 21 | +1.0 | Improved |
| Curve 22 | −1.4 | Degraded (skin disappeared) |

According to the tests conducted by the present inventors, the degree of lowering ΔD of the density at the boundary level Do was within the range of 0 to 0.7, more preferably 0.1 to 0.6 in order to effectively enhance the diagnostic efficiency and accuracy.

From the above results of the tests, it is noted that the diagnostic efficiency and accuracy are improved by lowering the minimum density value of the original image down to the level of the fog density of the photographic film and lowering the density of the image as a whole with the degree of lowering decreasing from the lower density to the higher to enhance the contrast of the whole image as shown in the curves 12 and 16. Further, it is also noted that as shown in curves 14, 17 and 20 the diagnostic efficiency and accuracy are further improved by, in addition to the above processing, raising the boundary density between the subcutaneous tissue and the skin by 0 to 0.7 to lower the contrast of the image in the density region higher than this boundary density than the density region lower than this boundary density.

Figure 7:
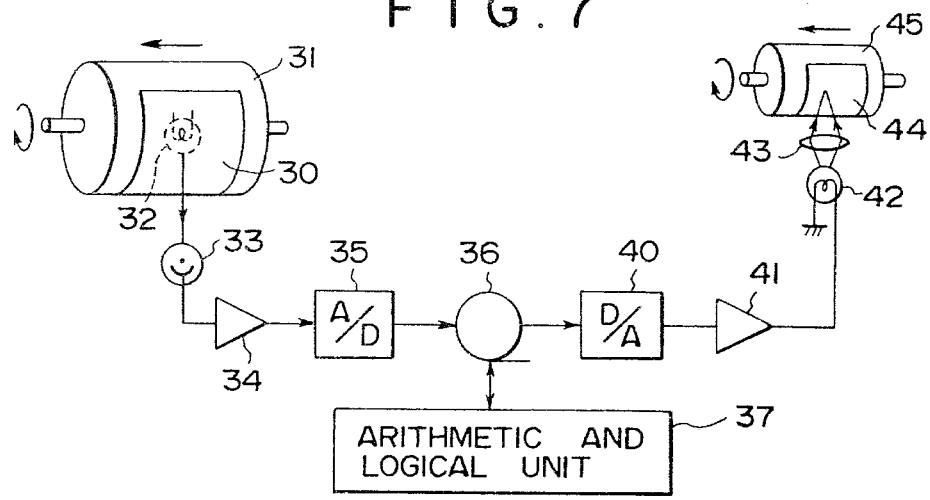
FIG. 7 is a block diagram of a mammogram copying system in which the image processing apparatus of the present invention is employed, and FIGS. 8 and 9 histograms of the densities of the glandular tissue, subcutaneous tissue and skin.

FIG. 7 is a block diagram showing the outline of the mammogram copying system in which the method and apparatus of this invention are embodied. An original mammogram 30 on which a mamma image is recorded is mounted on a transparent drum 31. The transparent drum 31 is moved in the axial direction as well as rotated about its axis so that the mammogram 30 is exposed to a light beam from a read-out light source 32 which is located inside the transparent drum 31. Thus, the light beam scans the mammogram 30 in the two dimensional scanning mode. As for the light beam scanning means may be used an image pick-up tube (for example, vidicon, iconoscope) or a flying spot scanner.

The light passing through the mammogram 30 is received by a photodetector 33 and converted to an electric signal, which is amplified by an amplifier 34 and converted to a digital signal through an A/D converter 35. The digital signal thus obtained is memorized in a magnetic memory tape 36. The data memorized in the magnetic memory tape 36 is input into arithmetic and logical units or processor 37 like a computer, wherein the Dmax, Do and Dmin of the original image signal are analyzed.

Figure 8:
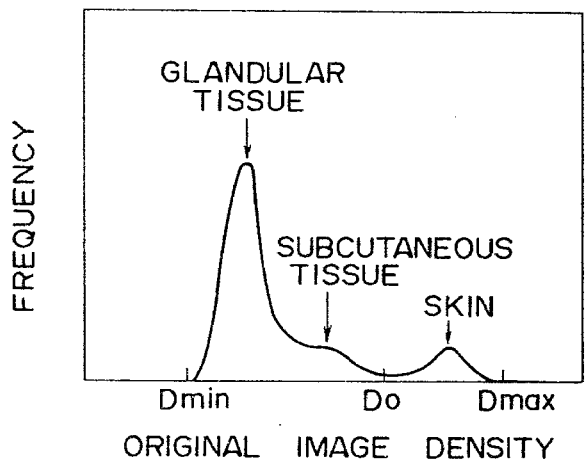

In the normal mammogram, a histogram as shown in FIG. 8 can be obtained. In the histogram shown in FIG. 8, the density for the area outside the object is not included. This histogram has three peaks the lowest one thereof representing the frequency distribution for the glandular tissue, the central one representing that of the subcutaneous tissue and the highest one representing that of the skin. The height of the three peaks and the width thereof are different depending upon the range of the part of the human body for which the histogram was made, the shape of the mamma and so on. The minimum and maximum values Dmin and Dmax are calculated as the points where the frequency of the histogram falls to zero or a predetermined small value, e.g. 1 to 2% of the maximum frequency. The boundary level Do of the density at the boundary of the subcutaneous tissue and the skin can be determined as the level of the density at the bottom of the valley of the histogram between adjacent two peaks as shown in FIG. 8 or as the average value of the two densities Dh and Df corresponding to the two peaks, i.e. (Dh+Df)/2.

Figure 9:
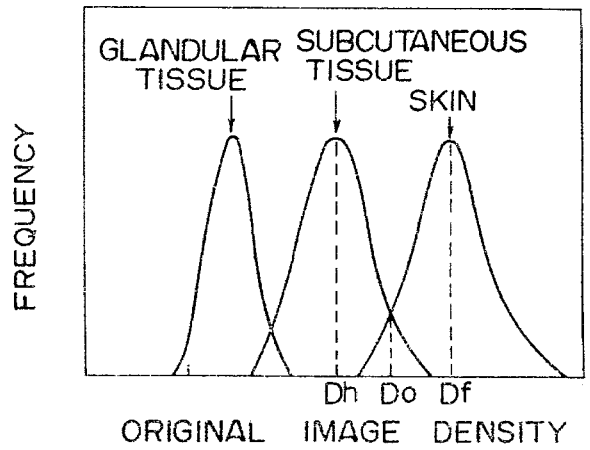

When three histograms are separately made for the three portions as shown in FIG. 9, the boundary level Do can be determined as the average value of the two peaks, i.e. (Dh+Df)/2, or as the level of the signal at the crossing point of the two histograms.

In view of the simplicity of calculation, the above mentioned methods of determining the boundary level Do are advantageous in practice, though there are various other methods possible for determining the boundary level Do. Though it is practically very difficult to obtain the true boundary level Do from the histogram, it has been confirmed that favorable results were obtained even with the above-mentioned approximate value of the boundary level Do.

After these values, Dmin, Do and Dmax, have been obtained, the data recorded in the magnetic memory tape 36 are processed to perform the density conversion of gradation processing as shown in FIGS. 2A and 2B so that the mammogram may be reproduced on the final recording medium in the desirable gradation. The processed data are returned to the magnetic memory tape 36 for memorization of the data after processing. The operation of the density conversion can also be performed in the form of analog signals. Further, the signal processing may include the process for compensation for the gradation of the final recording medium such as a photographic film. Furthermore, an unsharp masking process and/or a frequency filtering can be conducted to control the sharpness of the image.

The gradation processed data are read out from the magnetic memory tape 36, converted to an analog signal by a D/A converter 40 and input into a recording light source 42 after amplified by an amplifier 41.

The light emitted from the light source 42 is focused on a copy film 44 by means of a lens 43 to record an image thereon. The copy film 44 is mounted on a recording drum 45 which is rotated and axially moved for causing the copy film mounted thereon to be exposed to the light from the light source 42 in a two dimensional scanning mode so that a mammogram is recorded on the copy film 44 in the gradation processed form.

As for the copy film 44 can be used a photosensitive material like a silver halide photographic film, diazo film, electrophotographic material and so forth. Further, it is possible to display the image on a monitor like a CRT instead of recording the image on a photosensitive material.

We claim:

1. A method of processing a mammogram image which includes images of glandular tissue, subcutaneous tissue, and skin where the densities of the images increase from a minimum density of the glandular tissue through a boundary density between the densities of the subcutaneous tissue and the skin to a maximum density of the skin where the mammogram image is scanned with a light beam and the image densities recorded therein are read out and converted into an electric signal, the level of which varies with the recorded image densities, and then an image is recorded on a recording medium having a fog density by use of the electric signal, said method comprising lowering the level of the electric signal corresponding to the minimum density of the glandular tissue of the mammogram down to a level between the level corresponding to the fog density and a level higher than the level corresponding to fog density by 0.3 in terms of the density of the recording medium, and lowering the density of the mammogram image as a whole with the lowering degree decreasing from the smaller densities thereof to the higher densities, whereby the contrast of the mammogram image is raised in the image recorded on the recording medium.

2. A method of processing a mammogram image as defined in claim 1 further comprising raising the level of the electric signal corresponding to the boundary density between the densities of the subcutaneous tissue and the skin, whereby the contrast of the image of the density region higher than said boundary density is lowered with respect to the contrast of the image of the density region lower than said boundary density.

3. A method of processing a mammogram image as defined in claim 2 wherein the level of the electric signal corresponding to the boundary density is raised by 0 to 0.7 in terms of the density of the recording medium.

4. A method of processing a mammogram image as defined in claim 3 wherein the level of the electric signal is generally raised where the level of the signal corresponding to the boundary density is raised the most, the degree of raising of the level of the electric signal being gradually increased from the level corresponding to the minimum density of the glandular tissue to said level corresponding to the boundary density and gradually decreased from the level corresponding to the boundary density to the level corresponding to the maximum density of the skin.

5. An apparatus for processing a mammogram image which includes images of glandular tissue, subcutaneous tissue, and skin where the densities of the images increase from a minimum density of the glandular tissue through a boundary density between the densities of the subcutaneous tissue and the skin to a maximum density of the skin where the mammogram image is scanned with a light beam and the image densities recorded therein are read out and converted into an electric signal, the level of which varies with the recorded image densities, and then an image is recorded on a recording medium having a fog density by use of the electric signal, said apparatus comprising means for detecting a level of said electric signal corresponding to the boundary density between the densities of the subcutaneous tissue and the skin and the substantial maximum and minimum values of said electric signal, and means for converting the level of said electric signal so that at least the level of said minimum value of the electric signal is lowered from the detected level.

6. An apparatus as defined in claim 5 where said converting means further comprises means for generally raising the level of said electric signal between said levels of the detected maximum and the converted minimum values, the degree of raising of the level of the electric signal being gradually increased from the level of the converted minimum value to said level of the boundary density and gradually decreased from the level of the boundary density to the level of the maximum value.

7. An apparatus as defined in claim 5 where said converting means further comprises means for raising the level of the electric signal corresponding to said boundary density from its detected level.

8. An apparatus as defined in claim 6 or 7 where said converting means further comprises means for raising the level of the electric signal corresponding to the detected maximum value thereof.

* * * * *